United States Patent
Suzuki

[15] 3,661,456
[45] May 9, 1972

[54] SLIT EXPOSURE OPTICAL SYSTEM

[72] Inventor: Shigeru Suzuki, Yokohama-shi, Japan

[73] Assignee: Kabushiki Kaisha Ricol, Tokyo, Japan

[22] Filed: Feb. 25, 1969

[21] Appl. No.: 802,023

[30] Foreign Application Priority Data

Feb. 29, 1968 Japan.....................................43/13080

[52] U.S. Cl.................................355/66, 355/18, 355/65
[51] Int. Cl................................................................G03b 27/70
[58] Field of Search..............................355/66, 18, 64, 65, 51

[56] References Cited

UNITED STATES PATENTS

| | | | |
|---|---|---|---|
| 3,431,053 | 3/1969 | Wick et al. | 355/66 |
| 3,497,298 | 2/1970 | Watanabe | 355/66 |

Primary Examiner—Samuel S. Matthews
Assistant Examiner—E. M. Bero
Attorney—Burgess, Ryan and Wayne

[57] ABSTRACT

A slit exposure optical system in which an original is held in position on one side of a photocopying lens while a copying paper is arranged to move on the other side of said lens; a reflecting mirror is disposed at a right angle to the copying paper and a slit is arranged to contact with the copying paper; and said reflecting mirror is displaced at a speed of one-half that of the copying paper in the same direction therewith.

1 Claim, 1 Drawing Figure

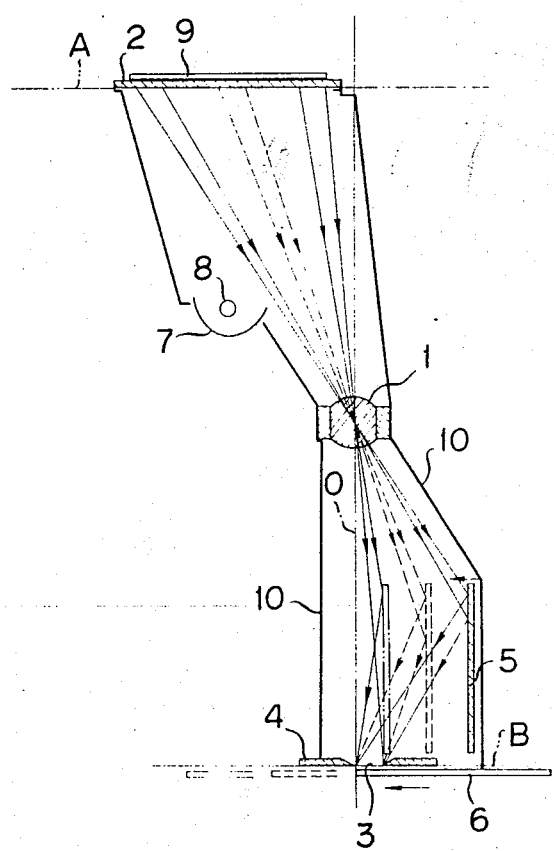
INVENTOR
SHIGERU SUZUKI
BY Burgess, Ryan + Hicks
ATTORNEYS

3,661,456

SLIT EXPOSURE OPTICAL SYSTEM

BACKGROUND OF THE INVENTION

The present invention relates to a slit exposure optical system and more particularly an optical system in a photocopying machine or the like in which the image of an original is focused through a slit upon a copying paper so as to expose the same.

One of the conventional slit exposure optical systems is such that an exposure device incorporating therein such slit exposure optical system is displaced or reciprocated between an original and a copying paper both of which are held stationary. In a typical example of the conventional photocopying machines employing the slit exposure optical system of the type described above, it is required to arrange and dispose a copying paper automatic stop means for automatically stopping a copying paper fed toward a predetermined exposure position and a copying paper stand for supporting the paper so as to maintain it planar during exposure. A mechanism for automatically stopping a copying paper at a predetermined position with high accuracy has a complicated construction that is required for accurate actuation. Furthermore, the copying paper stand has an area generally larger than the exposure area so that the conventional photocopying machines are unavoidably large in size.

In view of the above, the present invention has for its object to eliminate the above defects of the conventional system and improve the efficiency of photocopying by providing a novel optical system in which the pattern of the original held stationarily in position is focused upon a moving copying paper so as to expose it.

SUMMARY OF THE INVENTION

In brief, the slit exposure optical system of the present invention is such that an original holder is disposed upon one of a pair of planes perpendicular to the optical axis of a photocopying lens which is interposed between the pair of planes while a slit is positioned adjacent to said optical axis in the other of the pair of planes. The original holder and the slit are located respectively opposite sides with respect to an imaginary plane containing the optical axis. A copying paper to be exposed is moved at a predetermined constant speed in the direction at a right angle to the longitudinal direction of the slit in contact with the slit. A reflecting mirror is interposed between the planes of the lens and the slit in parallel with the imaginary plane and is adapted to move in the same direction with that of the copying paper at a speed of one-half of that of the copying paper. The light reflected by the original which is positioned so as to direct its surface toward the lens is focused upon the moving copying paper through the reflecting mirror and the slit while the reflecting mirror is moving at a speed of one half of that of the copying paper so that all the patterns of the original can be projected upon the copying paper, thereby providing a copy.

The above and other objects, advantages and features of the present invention will become apparent from the following description taken in conjunction with the accompanying drawings.

BRIEF DESCRIPTION OF DRAWING

The single FIGURE is a sectional view of one embodiment of a slit exposure optical system according to the present invention.

DESCRIPTION OF THE PREFERRED EMBODIMENT

An original holder 2 is disposed in a plane A perpendicular to the optical axis O of a photocopying lens 1 on one side of an imaginary plane including the optical axis O (a plane normal to the paper). Upon a plane B also perpendicular to the optical axis O and on the other side of the imaginary plane is disposed adjacent to the optical axis O a shielding plate 4 having a slit 3 in parallel with the imaginary plane. Between the lens 1 and the shielding plate 4 is disposed a reflecting mirror 5 in parallel with the imaginary plane and a photocopying paper feed device (not shown) adapted to feed a copying paper 6 at a predetermined constant speed in the direction indicated by the arrow is disposed below the shielding plate 4. The reflecting mirror 5 is interlocked with the feeding device so that the reflecting mirror is displaced in the direction indicated by the arrow in parallel with the imaginary plane at a speed one-half of the copying paper feed speed.

Below the original holder 2 is disposed an illumination lamp 8 provided with a reflecting plate 7 and the light from this lamp 8 is made incident upon the pattern or image of the original 9 which directs its pattern or image toward the lens 1 and is held in position upon the original holder 2. The light reflected by the original 9 is focused through the lens 1, reflected by the reflecting mirror 5 and made incident through the slit 3 so as to focus the photosensitized layer of the copying paper 6 which is being moved in the direction indicated by the arrow.

When the copying paper 6 is moving, the reflecting mirror is also moving in the same direction with that of the paper 6 at a speed one-half of that of the paper 6 so that the optical length between the lens 1 and the photosensitized surface of the copying paper 6 is always maintained at a predetermined length while only the angle of incidence of the light to the copying paper varies. Therefore, the pattern or image of the original 9 can be clearly focused upon the moving copying paper 6 without causing any distortion or deviation.

It is preferable that the copying paper 6 is disposed as closely as possible to the slit 3. For this purpose the copying paper 6 is pressed against the slit 3 by means of a pressure plate (not shown) having a width the same as that of the slit 3. Furthermore in order to prevent the lights other than that reflected by the pattern or image of the original from being incident upon the copying paper 6 during exposure thereof, the shielding plate 4 is surrounded peripherally with a shielding wall 10.

The copying paper 6 may be a rolled copying paper or a cut copying paper sized to the dimensions of the original.

According to the present invention in which the original held in stationary position is focused upon a moving copy paper through the slit exposure optical system comprising a fixed photocopying lens, a moving reflecting mirror and so on as described above, it is not necessary to hole in stationary position a copying paper opposed to the conventional optical system of the type described. Furthermore, in the optical system of the present invention it is only necessary to provide an area to be exposed having the same dimensions (length and width) with those of the slit so that it is feasible to eliminate a large-sized copying paper feeding device or copying paper holding device in the conventional system. Moreover, since the exposure can be carried out while the copying paper is being moved, the efficiency of photocopying is much facilitated.

The present invention has been so far described with particular reference with one preferred embodiment thereof, but it will be understood that variations and modifications can be effected without departing the true spirit of the present invention as described hereinafter and as defined in the appended claim.

I claim:
1. A slit exposure optical system comprising
 an original holder positioned in a horizontal plane;
 a copy paper positioned in a plane spaced from said original plane, said copy paper plane being parallel to said original holder plane;
 said copy paper mounted to be movable at a predetermined speed in said copy paper plane;
 a photocopying lens is fixed at a location intermediately spaced between said parallel planes;
 a light source is positioned between said photocopying lens and said original holder so that light from said source provides the reflection of an image in a straight line directly from said original through said photocopying lens;